Feb. 20, 1923.
E. J. WEICHMAN
ANTISKID DEVICE FOR TIRES
Filed Oct. 22, 1921
1,445,810
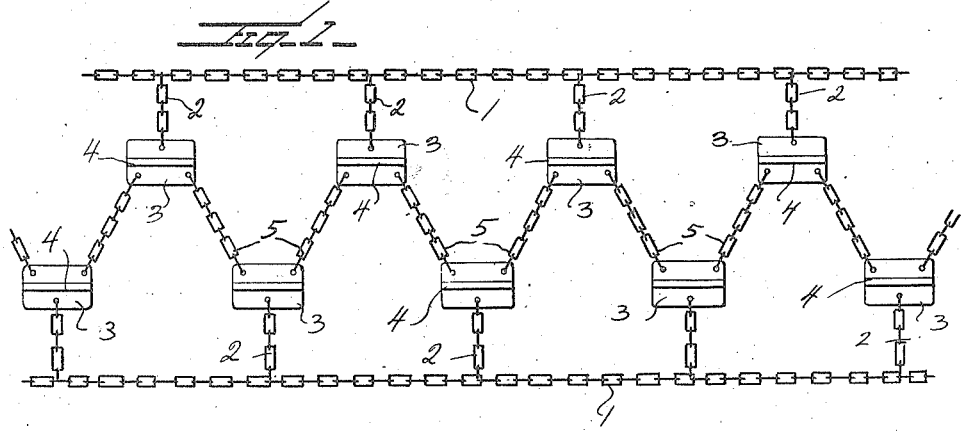
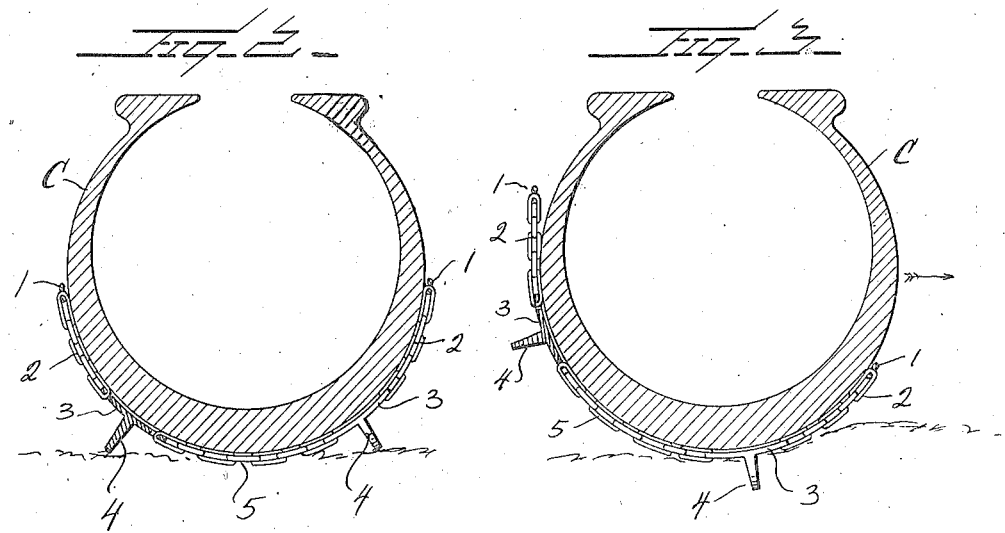
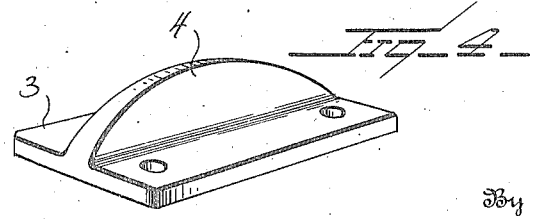
Inventor
E. J. Weichman
By Watson E. Coleman
Attorney Patented Feb. 20, 1923.

1,445,810

UNITED STATES PATENT OFFICE.

EDWARD J. WEICHMAN, OF YOUNGSTOWN, OHIO.

ANTISKID DEVICE FOR TIRES.

Application filed October 22, 1921. Serial No. 509,452.

*To all whom it may concern:*

Be it known that I, EDWARD J. WEICHMAN, a citizen of the United States, residing at Youngstown, in the county of Mahoning and State of Ohio, have invented certain new and useful Improvements in Antiskid Devices for Tires, of which the following is a specification, reference being had to the accompanying drawings.

This invention relates to certain improvements in anti-skid devices for tires, and it is an object of the invention to provide a novel and improved device of this general character comprising a plurality of plates having projecting ribs or lugs, the plates being arranged in two sets disposed at opposite sides of the transverse center of the tread of the tire with the ribs or lugs projecting at an angle to the plane of the wheel and so positioned as to have slight contact with the roadway or other surface when the coacting wheel is traveling straight ahead, together with a pair of side chains for maintaining the plates in applied position, said side chains, upon side skid of the wheel, permitting a set of plates to move toward the transverse center of the tread of the tire whereby the ribs or lugs of said plates are enabled to have effective gripping action on the roadway or other surface to withstand said side skid.

In the majority of anti-skid devices now in use, the anti-skidding means are so arranged on the wheel and tire to prevent slipping in the direction in which the wheel is revolved. The most dangerous skidding takes place when a car is turning and slides sideways to the direction of travel. Another object of the invention is to provide means to prevent skidding in the direction in which the machine is traveling.

An additional object of the invention is to provide a novel and improved device of this general character embodying side chains and plates interposed between said side chains and secured thereto and to each other by transversely disposed tread chains, each of the plates having a single outstanding rib or lug disposed in a direction circumferentially of the tire or wheel to which the device is applied, the transversely disposed chains affording a grip to prevent skidding in the direction in which the associated wheel is traveling, while the ribs or lugs carried by the plates effectually prevent skidding at right angles to the direction of travel.

The invention consists in the details of construction and in the combination and arrangement of the several parts of my improved anti-skid device for tires whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in plan illustrating an anti-skidding device constructed in accordance with an embodiment of my invention and unapplied;

Figure 2 is a transverse sectional view showing the device applied and in normal position;

Figure 3 is a view similar to Figure 2 but showing the device in a position to withstand a side skid; and Figure 4 is a view in perspective of one of the plates.

As disclosed in the accompanying drawings, C denotes the casing of a tire having applied thereto an anti-skidding device constructed in accordance with an embodiment of my invention.

The anti-skidding device consists of a pair of side chains 1 which are adapted to be disposed circumferentially of the casing C at opposite sides thereof in a conventional manner. A plurality of transverse chains 2 are secured to the side chains 1, said chains 2 being alternately arranged and terminating short of the transverse center of the tread of the casing C when the device is applied thereto or of a length to terminate short of the transverse center between the side chains 1 when said side chains are at the limit of their separation.

Two sets of anti-skid members in the form of plates 3 are secured to the chains 2 and, as is clearly shown in the accompanying drawings, these plates are so arranged that the sets assume a position to each side of the center of the tread of the casing C when the device is applied thereto.

As disclosed in the accompanying drawings, each of the plates 3 is provided with an integral rib 4 projecting from the outer face of the plate, said rib being of varying height with the greatest height at substantially the longitudinal center of the plate. The rib 4 projects outwardly from the plate 3 at substantially right angles thereto and at an angle to the plane of the casing C when the device is in applied position. The two sets of plates are connected to each other by the diagonally disposed chains 5.

Each of the plates 3 is elongated in form with its major axis disposed circumferentially of the casing C to which the device is applied and the rib 4 is positioned at substantially the transverse center of said plate and extends entirely therealong. A chain 2 is secured to each plate 3 at substantially the longitudinal center of the outer marginal portion of said plate while the diagonal chains 5 are secured to the inner marginal portion of said plate adjacent its opposite ends.

In practice, with the wheel with which the anti-skid device is associated traveling substantially straight ahead, the sets of plates 3 are at opposite sides of the transverse center of the tread of the casing C, said plates being so positioned that the highest point of the ribs or lugs 4 will have slight contact with the roadway or other surface over which the tire is traversing. Under these conditions, the chains 2 and 5 effectually serve to prevent slipping or skidding in the direction of travel. In the event of a side skid as occurs during a turning operation, the ribs or lugs 4 at the side of the transverse center of the casing toward which the side skid occurs will cause the associated plates to move or travel inwardly of the casing C to substantially the transverse center of the tread of the casing, whereby an effective grip on the roadway or other surface is assured to offset the side slip. When the normal travel of the vehicle has been attained, the anti-skidding device automatically returns to arrange the plates 3 in their normal positions.

It has been fully established in practice that with the anti-skid device in applied or working position there is enough slack in the side chains 1 to permit a set of plates 3 to move to the center of the casing C and to remain in such position as long as the vehicle has a tendency to side skid.

From the foregoing description it is thought to be obvious that an anti-skid device for tires constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

An anti-skid device comprising a pair of side chains to be arranged circumferentially of a tire, plates secured to said chains, said plates being in two sets, each set being normally to one side of the transverse center of the tread of the tire when the device is in applied position, means for connecting each applied set with two adjacent plates of plate of one set with two adjacent plates of the second set, and a rib carried by each of the plates and disposed in a direction circumferentially of the tire when the device is in applied position, said rib being of a height to have contact with a supporting surface when the plate is in its normal position, the side chains permitting a plate when in contact with the supporting surface to move toward the transverse center of the tire upon side skid.

In testimony whereof I hereunto affix my signature.

EDWARD J. WEICHMAN.